(12) United States Patent
Wong et al.

(10) Patent No.: US 12,278,708 B2
(45) Date of Patent: Apr. 15, 2025

(54) INFRASTRUCTURE EQUIPMENT, MOBILE TERMINAL, COMPUTER SOFTWARE AND METHODS

(71) Applicant: InterDigital Patent Holdings, Inc., Wilmington, DE (US)

(72) Inventors: Shin Horng Wong, Basingstoke (GB); Martin Warwick Beale, Basingstoke (GB); Samuel Asangbeng Atungsiri, Basingstoke (GB)

(73) Assignee: Interdigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/609,748

(22) PCT Filed: May 2, 2018

(86) PCT No.: PCT/EP2018/061197
§ 371 (c)(1),
(2) Date: Oct. 31, 2019

(87) PCT Pub. No.: WO2018/202705
PCT Pub. Date: Nov. 8, 2018

(65) Prior Publication Data
US 2020/0059331 A1     Feb. 20, 2020

(30) Foreign Application Priority Data
May 3, 2017   (EP) ..................................... 17169347

(51) Int. Cl.
*H04L 1/1867*     (2023.01)
*H04L 5/00*     (2006.01)
(Continued)

(52) U.S. Cl.
CPC .......... *H04L 1/1887* (2013.01); *H04L 5/0087* (2013.01); *H04W 72/0446* (2013.01); *H04W 72/23* (2023.01)

(58) Field of Classification Search
None
See application file for complete search history.

(56) References Cited

U.S. PATENT DOCUMENTS 8,873,489 B2    10/2014   Liao et al.
9,949,261 B2    4/2018   Chen et al.
(Continued)

FOREIGN PATENT DOCUMENTS

CN     101715237 A     5/2010
CN     102577571 A     7/2012
(Continued)

OTHER PUBLICATIONS

Author Unknown, DL HARQ considerations for URLLC and punctured eMBB, pp. 1-4, Apr. 7, 2017.*
(Continued)

*Primary Examiner* — Christopher M Crutchfield
(74) *Attorney, Agent, or Firm* — Flaster Greenberg P.C.

(57) ABSTRACT

Infrastructure equipment for use in a telecommunications system, the infrastructure equipment comprising: transceiver circuitry and control circuitry, whereby the transceiver circuitry, under control of the control circuitry, is configured to: transmit first data to a first mobile device and second data to a second mobile device, wherein the transmission period of the second data is shorter than the transmission period of the first data and the second data is transmitted after the start of the first data, and uses transmission resources allocated to, the first data; and transmit to the first mobile device, indication data that contains information identifying the resources allocated to the second
(Continued)

data, wherein the granularity of the resources is determined in accordance with the first data.

18 Claims, 10 Drawing Sheets

(51) Int. Cl.
*H04W 72/0446* (2023.01)
*H04W 72/23* (2023.01)

(56) References Cited

U.S. PATENT DOCUMENTS

| | | | |
|---|---|---|---|
| 10,230,480 B2 | 3/2019 | Li et al. | |
| 10,555,294 B2 | 2/2020 | Kim et al. | |
| 10,834,631 B2* | 11/2020 | Kim | H04L 5/00 |
| 11,218,271 B2 | 1/2022 | Xiong et al. | |
| 11,671,973 B2 | 6/2023 | Rudolf et al. | |
| 11,770,220 B2 | 9/2023 | Bala et al. | |
| 11,848,783 B2 | 12/2023 | Kini et al. | |
| 2008/0192847 A1 | 8/2008 | Classon et al. | |
| 2011/0255485 A1 | 10/2011 | Chen et al. | |
| 2013/0051354 A1* | 2/2013 | Ling | H04L 1/005 370/329 |
| 2014/0126490 A1 | 5/2014 | Chen et al. | |
| 2015/0085717 A1 | 3/2015 | Papasakellariou et al. | |
| 2015/0131579 A1 | 5/2015 | Li et al. | |
| 2015/0230211 A1 | 8/2015 | You et al. | |
| 2015/0271814 A1 | 9/2015 | Park et al. | |
| 2016/0205664 A1 | 7/2016 | Zhang et al. | |
| 2016/0227560 A1 | 8/2016 | Webb et al. | |
| 2016/0234857 A1 | 8/2016 | Chen et al. | |
| 2016/0323850 A1 | 11/2016 | Papasakellariou et al. | |
| 2017/0085326 A1 | 3/2017 | Li et al. | |
| 2017/0310431 A1 | 10/2017 | Iyer et al. | |
| 2017/0353963 A1* | 12/2017 | Hong | H04W 72/082 |
| 2017/0359897 A1* | 12/2017 | Pueschner | G06K 19/07747 |
| 2017/0367046 A1 | 12/2017 | Papasakellariou | |
| 2018/0027576 A1* | 1/2018 | Kowalski | H04W 72/0446 370/329 |
| 2018/0035332 A1 | 2/2018 | Agiwal et al. | |
| 2018/0041325 A1 | 2/2018 | Lee et al. | |
| 2018/0063749 A1* | 3/2018 | Islam | H04W 28/18 |
| 2018/0063865 A1* | 3/2018 | Islam | H04W 76/27 |
| 2018/0070341 A1* | 3/2018 | Islam | H04L 1/1812 |
| 2018/0115964 A1* | 4/2018 | Lin | H04W 72/04 |
| 2018/0227958 A1 | 8/2018 | Xiong et al. | |
| 2018/0248597 A1* | 8/2018 | Jiang | H04W 72/12 |
| 2018/0270022 A1* | 9/2018 | Sun | H04L 1/0061 |
| 2018/0278454 A1* | 9/2018 | Islam | H04L 5/0073 |
| 2018/0287745 A1* | 10/2018 | Sun | H03M 13/1111 |
| 2018/0359745 A1 | 12/2018 | Yeo et al. | |
| 2019/0044601 A1 | 2/2019 | Chang et al. | |
| 2019/0098608 A1 | 3/2019 | Yi et al. | |
| 2019/0132823 A1* | 5/2019 | Sano | H04L 5/0051 |
| 2019/0165882 A1 | 5/2019 | You et al. | |
| 2019/0165894 A1 | 5/2019 | Choi et al. | |
| 2019/0229840 A1 | 7/2019 | Takeda et al. | |
| 2019/0260519 A1* | 8/2019 | Du | H04L 1/1887 |
| 2019/0268096 A1 | 8/2019 | Takeda et al. | |
| 2019/0289614 A1* | 9/2019 | Li | H04W 74/0833 |
| 2019/0320450 A1 | 10/2019 | Li et al. | |
| 2019/0327038 A1* | 10/2019 | Du | H04L 1/1896 |
| 2019/0327723 A1* | 10/2019 | Li | H04W 72/12 |
| 2019/0327751 A1* | 10/2019 | Dong | H04L 5/0037 |
| 2019/0349174 A1* | 11/2019 | Guan | H04L 5/0055 |
| 2019/0349914 A1* | 11/2019 | Xu | H04L 5/0058 |
| 2019/0356415 A1* | 11/2019 | Peng | H04L 1/0038 |
| 2019/0364563 A1* | 11/2019 | Jung | H04W 72/042 |
| 2019/0387538 A1* | 12/2019 | Du | H04W 72/121 |
| 2020/0022160 A1* | 1/2020 | Zou | H04W 72/1268 |
| 2020/0044776 A1* | 2/2020 | Guan | H04L 1/0069 |
| 2020/0053698 A1* | 2/2020 | Chen | H04W 72/02 |
| 2020/0076484 A1* | 3/2020 | Noh | H04L 5/001 |
| 2020/0077470 A1* | 3/2020 | Xiong | H04L 1/1854 |
| 2020/0099399 A1* | 3/2020 | Xie | H03M 13/13 |
| 2020/0214020 A1* | 7/2020 | Hong | H04L 1/0013 |
| 2020/0228239 A1* | 7/2020 | Wang | H04L 1/0057 |
| 2020/0235752 A1* | 7/2020 | Sandberg | H03M 13/6522 |
| 2020/0235759 A1* | 7/2020 | Ye | H03M 13/116 |
| 2020/0351876 A1* | 11/2020 | Hong | H04L 5/0053 |
| 2020/0358557 A1* | 11/2020 | Park | H04L 1/0057 |
| 2021/0135791 A1* | 5/2021 | Wang | H04L 1/0009 |
| 2021/0321270 A1* | 10/2021 | Li | H04L 5/0064 |

FOREIGN PATENT DOCUMENTS

| | | | |
|---|---|---|---|
| CN | 105101283 A | | 11/2015 |
| CN | 102893684 B | | 9/2016 |
| CN | 105979597 A | | 9/2016 |
| CN | 106455103 A | | 2/2017 |
| CN | 201710288177 | * | 4/2017 |
| CN | 108270539 A | | 7/2018 |
| EP | 2557879 A1 | | 2/2013 |
| JP | 2018-511203 A | | 4/2018 |
| WO | WO 2016/126398 A1 | | 8/2016 |
| WO | 2017/059829 A1 | | 4/2017 |
| WO | WO 2017/099834 A1 | | 6/2017 |
| WO | WO 2017/166217 A1 | | 10/2017 |

OTHER PUBLICATIONS

Author Unknown, On pre-emption indication for DL multiplexing of URLLC and eMBB, pp. 1-5, Apr. 7, 2017.*
Author Unknown, On indication fordownlink punctured / preemptive scheduling, pp. 1-4, Apr. 7, 2017.*
Author Unknown, On DL multiplexing of URLLC and eMBB transmissions, pp. 1-10, Doc No. R1-1701663, Feb. 17 (Year: 2017).*
Author Unknown, On DL multiplexing of URLLC and eMBB transmissions, Doc. No. R1-1704216, pp. 1-8, Apr. 3 (Year: 2017).*
Author Unknown, Considerations on eMBB/URLLC multiplexing for DL, Doc. No. R1-1705830, pp. 1-3, Apr. 7 (Year: 2017).*
International Search Report and Written Opinion dated Jul. 12, 2018 for PCT/EP2018/061197 filed on May 2, 2018, 15 pages.
11 5gmf, "5G Radio Access Technologies", Jul. 5, 2016, XP055384668, Retrieved from the Internet URL:http://5gmf.jp/wp/wp-content/uploads/2016/07/SGMF_WPIOO_11_5G_RAT.pdf on Jun. 23, 2017, pp. 104-129.
Ji, H., et al., "Introduction to Ultra Reliable and Low Latency Communications in 5G", arXiv.org, Apr. 19, 2017 Cornell University Library, 201 Olin Library Cornell University Ithaca, NY 14853, Apr. 19, 2017, 15 pages.
CN 101715237 A, Cited in related U.S. Appl. No. 18/136,482, in the Information Disclosure Statement, dated Mar. 19, 2023. ***Translation provided by Espacenet.com.
WO 2017/166217 A1, Cited in related U.S. Appl. No. 18/136,482, in the Office Action, dated Nov. 24, 2023. ***Translation provided by Espacenet.com.
3rd Generation Partnership Project (3GPP) "Technical Specification Group Radio Access, Evolved Universal Terrestrial Radio Access (E-UTRA) Physical layer procedures (Release 14)", 3GPP TS 36.213 V14.4.0, Sep. 2017, 462 pages.
3rd Generation Partnership Project (3GPP), "Channel Coding Schemes for eMBB and URLLC Coexistence", Sharp, MTI, R1-167617, 3GPP TSG RAN WG1, Meeting # 86, Gothenburg, Sweden, Aug. 22-26, 2016, 10 pages.
3rd Generation Partnership Project (3GPP), "Consideration on Grant Free Transmission for NR", Huawei, HiSilicon, R2-165442, 3GPP TSG-RAN WG2 Meeting #95, Gothenburg, Sweden, Aug. 22-26, 2016, 3 pages.
3rd Generation Partnership Project (3GPP), "CSI-RS Overhead Reduction for Beamformed CSI-RS Transmission Schemes"; R1-164336, 3GPP TSG RAN WG1 Meeting #85, Nanjing, China, May 23-27, 2016, 3 pages.
3rd Generation Partnership Project (3GPP), "DCI-light/free URLLC Transmission in DL", R1-1702726, 3GPP TSG RAN WG1 Meeting #88, Athens, Greece, Feb. 13-17, 2017, 4 pages.

(56) References Cited

OTHER PUBLICATIONS

3rd Generation Partnership Project (3GPP), "Discussion on efficient utilization of BF CSI-RS", R1-164858, 3GPP TSG RAN WG1 Meeting #85, Nanjing, China, May 23-27, 2016, 4 pages.
3rd Generation Partnership Project (3GPP), "Discussion on multiplexing of eMBB and URLLC", R1-167708, 3GPP TSG RAN1 WG Meeting #86, Gothenburg, Sweden, Aug. 22-26, 2016, 5 Pages.
3rd Generation Partnership Project (3GPP), "Downlink scheduling using slots and mini-slots", R1-1612314, 3GPP TSG-RAN WG1 Meeting #87, Reno, USA, Nov. 14-18, 2016, 4 pages.
3rd Generation Partnership Project (3GPP), "Downlink scheduling using slots and mini-slots", R1-1700858, 3GPP TSG RAN WG1 AH_NR Meeting, Spokane, USA, Jan. 16-20, 2017, 4 pages.
3rd Generation Partnership Project (3GPP), "Efficient multiplexing of traffic for different use cases", R1-167331,3GPP TSG-RAN WG1 Meeting #86, Gothenburg, Sweden, Aug. 22-26, 2016, 5 pages.
3rd Generation Partnership Project (3GPP), "Frame structure considerations for URLLC", R1-167127, 3GPP TSG RAN WG1 Meeting #86, Gothenburg, Sweden, Aug. 22-26, 2016, 10 pages.
3rd Generation Partnership Project (3GPP), "Handling URLLC in new Rat", R1-166886, 3GPP TSG RAN WG1 Meeting #86, Gothenburg, Sweden, Aug. 22-26, 2016, 5 pages.
3rd Generation Partnership Project (3GPP), "Multiplexing of eMBB and URLLC", ZTE, ZTE Microelectronics, R1-166408, 3GPP TSG RAN WG1, Meeting #86, Gothenburg, Sweden, Aug. 22-26, 2016, 10 pages.
3rd Generation Partnership Project (3GPP), "On Co-Existence of eMBB and URLLC", NTT Docomo, Inc., R1-167391, 3GPP TSG RAN WG1 Meeting #86, Aug. 22-26, 2016, 5 pages.
3rd Generation Partnership Project (3GPP), "Overall Discussion on URLLC", LG Electronics, R1-166882, 3GPP TSG RAN WG1 Meeting #86, Aug. 22-26, 2016, 5 pages.
3rd Generation Partnership Project (3GPP), "Punctured Scheduling for Low Latency Transmissions", R1-167308, 3GPP TSG-RAN WG1 #86, Gothenburg, Sweden, Aug. 22-26, 2016, 4 pages.
3rd Generation Partnership Project (3GPP), "Punctured Scheduling for Low Latency Transmissions", R1-165381, 3GPP TSG-RAN WG1 #85 Nanjing, P.R. China, May 23-27, 2016, May 23-27, 2016, 4 pages.
3rd Generation Partnership Project (3GPP), "Pusch resource allocation method", Intel Corporation, R1-166504, 3GPP TSG RAN WG1 #86, Aug. 22-26, 2016, 3 pages.
3rd Generation Partnership Project (3GPP), "Scheduling and support for service multiplexing", R1-1610090, 3GPP TSG-RAN WG1 Meeting #86bis, Lisbon, Portugal, Oct. 10-14, 2016, 5 pages.
3rd Generation Partnership Project (3GPP), "Scheduling and support for service multiplexing", R1-1612316, 3GPP TSG-RAN WG1 Meeting #87, Reno, USA, Nov. 14-18, 2016, 6 pages.
3rd Generation Partnership Project (3GPP), "Scheduling-based URLLC and eMBB multiplexing", R1-1700722, 3GPP TSG-RAN WG1 AH_NR Meeting, Spokane, USA, Jan. 16-20, 2017, 4 pages.
3rd Generation Partnership Project (3GPP), "Semi-Persistent Scheduling for 5G New Radio URLLC", Nokia, Alcatel-Lucent Shanghai Bell, R1-167309, 3GPP TSG-RAN WG1 #86, Aug. 22-26, 2016, 6 pages.
3rd Generation Partnership Project (3GPP), "Short-TTI PDSCH Design", R1-162964, 3GPP TSG RAN WG1 Meeting #84bis, Busan, Korea, Apr. 11-15, 2016, 3 pages.
3rd Generation Partnership Project (3GPP), "Technical Specification Group Radio Access Network, Evolved Universal Terrestrial Radio Access (E-UTRA) and Evolved Universal Terrestrial Radio Access Network (E-UTRAN), Overall Description, Stage 2 (Release 13)", 3GPP TS 36.300 V13.3.0, Mar. 2016, pp. 1-295.
3rd Generation Partnership Project (3GPP), "Technical Specification Group Radio Access Network, Evolved Universal Terrestrial Radio Access (E-UTRA) and Evolved Universal Terrestrial Radio Access Network (EUTRAN); overall description; Stage 2 (Release 13)", 3GPP TS 36.300 V13.9.0, Sep. 2017, 313 pages.
3rd Generation Partnership Project (3GPP), "Technical Specification Group Radio Access Network, Evolved Universal Terrestrial Radio Access (E-UTRA) and Evolved Universal Terrestrial Radio Access Network (E-UTRAN); overall description; Stage 2 (Release 14)", 3GPP TS 36.300 V14.4.0, Sep. 2017, 329 pages.
3rd Generation Partnership Project (3GPP), "Technical Specification Group Radio Access Network, Evolved Universal Terrestrial Radio Access (E-UTRA); Multiplexing and channel coding (Release 13)", 3GPP TS 36.212 V13.6.0, Jun. 2017, 140 pages.
3rd Generation Partnership Project (3GPP), "Technical Specification Group Radio Access Network, Evolved Universal Terrestrial Radio Access (E-UTRA); Physical layer procedures (Release 13)", 3GPP TS 36.213 V13.2.0, Jun. 2016, 381 pages.
3rd Generation Partnership Project (3GPP), "Technical Specification Group Radio Access Network, Evolved Universal Terrestrial Radio Access (E-UTRA); Physical layer procedures (Release 13)", 3GPP TS 36.213 V13.7.0, Sep. 2017, 391 pages.
3rd Generation Partnership Project (3GPP), "Technical Specification Group Radio Access Network, Evolved Universal Terrestrial Radio Access (E-UTRA); Radio Resource Control (RRC); Protocol specification {Release 14)", 3GPP TS 36.331 V14.4.0, Sep. 2017, 753 pages.
3rd Generation Partnership Project (3GPP), "Technical Specification Group Radio Access Network, NR; Multiplexing and channel coding (Release 15)", 3GPP TS 38.212 V0.1.0, Aug. 2017, 22 pages.
3rd Generation Partnership Project (3GPP), "Technical Specification Group Radio Access Network, NR; Radio Resource Control (RRC); Protocol specification (Release 15)", 3GPP TS 38.331 V0.0.5, Aug. 2017, 38 pages.
3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.4.0, Jun. 2016, 310 pages.
3rd Generation Partnership Project (3GPP), "Technical Specification Group Radio Access Network; Evolved Universal Terrestrial Radio Access (E-UTRA), Multiplexing and channel coding (Release 14),", 3GPP TS 36.212 V14.4.0, Sep. 2017, 198 pages.
3rd Generation Partnership Project (3GPP), "Technical Specification Group Radio Access Network; Evolved Universal Terrestrial Radio Access (E-UTRA); Multiplexing and channel coding (Release 13)", 3GPP TS 36.212 V13.2.0, Jun. 2016, 140 pages.
3rd Generation Partnership Project (3GPP), "Technical Specification Group Radio Access Network; Evolved Universal Terrestrial Radio Access (E-UTRA); Physical layer; Measurements (Release 13)", 3GPP TS 36.214 V13.2.0, Jun. 2016, 19 pages.
3rd Generation Partnership Project (3GPP), "Technical Specification Group Radio Access Network; Evolved Universal Terrestrial Radio Access (E-UTRA); Physical layer; Measurements (Release 13)", 3GPP TS 36.214 V13.5.0, Sep. 2017, 21 pages.
3rd Generation Partnership Project (3GPP), "Technical Specification Group Radio Access Network; Evolved Universal Terrestrial Radio Access (E-UTRA); Physical layer; Measurements (Release 14)", 3GPP TS 36.214 V14.3.0, Sep. 2017, 22 pages.
3rd Generation Partnership Project (3GPP), "Technical Specification Group Radio Access Network; Evolved Universal Terrestrial Radio Access (E-UTRA); Physical layer; Measurements (Release 15)", 3GPP TS 36.214 V15.0.0, Sep. 2017, 23 pages.
3rd Generation Partnership Project (3GPP), "Technical Specification Group Radio Access Network; Evolved Universal Terrestrial Radio Access (E-UTRA); Radio Resource Control (RRC); Protocol specification (Release 11)", 3GPP TS 36.331 V11.16.0, Jun. 2016, 360 pages.
3rd Generation Partnership Project (3GPP), "Technical Specification Group Radio Access Network; Evolved Universal Terrestrial Radio Access (E-UTRA); Radio Resource Control (RRC); Protocol specification (Release 13)", 3GPP TS 36.331 V13.2.0, Jun. 2016, 623 pages.
3rd Generation Partnership Project (3GPP), "Technical Specification Group Radio Access Network; Evolved Universal Terrestrial Radio Access (E-UTRA); Radio Resource Control (Rrc); Protocol Specification (Release 13)", 3GPP TS 36.331 V13.7.0, Sep. 2017, 642 pages.

(56) References Cited

OTHER PUBLICATIONS

3rd Generation Partnership Project (3GPP), "Technical Specification Group Radio Access Network; NR; Physical Layer Procedures for Control (Release 15)", 3GPP TS 38.213 V1.0.0, Sep. 2017, 16 pages.

3rd Generation Partnership Project (3GPP), "Technical Specification Group Radio Access Network; NR; Physical layer procedures for data (Release 15)", 3GPP TS 38.214 V0.0.1, Jul. 2017, 20 pages.

3rd Generation Partnership Project (3GPP), "Ue Support for Multiple Numerologies with NR", InterDigital Communications, R2-165055, 3GPP TSG-RAN WG1 #86, Göteborg, Sweden, Aug. 22-26, 2016, 3 pages.

3rd Generation Partnership Project (3GPP), "WF on Supporting URLLC in NR", LG Electronics, ZTE, R1-168438, 3GPP TSG RAN WG1 Meeting #86, Aug. 22-26, 2016, 2 pages.

Chinese Office Action, dated Oct. 25, 2021, cited in Chinese Application No. 201780059298.5, 12 pages.

* cited by examiner

INFRASTRUCTURE EQUIPMENT.

First Mobile Device

INFRASTRUCTURE EQUIPMENT, MOBILE TERMINAL, COMPUTER SOFTWARE AND METHODS

CROSS-REFERENCE TO RELATED APPLICATIONS

The present application is based on PCT filing PCT/EP2018/061197, filed May 2, 2018, which claims priority to EP 17169347.6, filed May 3, 2017, the entire contents of each are incorporated herein by reference.

FIELD

The present disclosure relates to Infrastructure equipment, mobile terminal, computer software and methods.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio (NR) system/new radio access technology (RAT), networks, to efficiently support connectivity for a wide range of devices associated with different applications with different characteristic data traffic profiles, resulting in different devices having different operating characteristics/requirements, such as:

High latency tolerance
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars).
Low device cost and energy consumption
Flexible spectrum usage
Flexible mobility
Ultra-reliable and Low latency A 3GPP Study Item (SI) on New Radio Access Technology (NR) [1] has been completed and a Work Item (WI) has been agreed to specify functionalities for NR [2] which would be the new Radio Access Technology (RAT) for such a next generation wireless communication system. The new RAT is expected to operate in a large range of frequencies and it is expected to cover a broad range of use cases. Example use cases that are considered under this SI are:

Enhanced Mobile Broadband (eMBB)
Massive Machine Type Communications (mMTC)
Ultra Reliable & Low Latency Communications (URLLC)

eMBB services are typically high capacity services with a requirement to support up to 20 Gb/s. For efficient transmission of large amounts of data at high throughput, eMBB services are expected to use a long scheduling time so as to minimise the overhead, where scheduling time refers to the time available for data transmission between allocations. In other words, eMBB services are expected to have relatively infrequent allocation messages and to have longer time period allocated to data transmission in-between allocation messages.

On the other hand URLLC services are low latency services, wherein the latency is measured from the ingress of a layer 2 packet to its egress from the network, with a proposed target of 1 ms. URLLC data is generally expected to be short such that smaller scheduling times are generally expected compared to eMBB transmissions. As the skilled person will understand, eMBB transmissions and URLLC transmissions have different requirements and expectations, wherein high capacity and low overhead is desired for one while low latency is desired for the other.

It is therefore challenging to conceive a system which can accommodate both needs and where these two very different types of transmissions can be transmitted in a satisfactory manner. In view of this, there is a desire to provide arrangements and systems where high capacity and low latency transmissions can be communicated at the same time while trying to optimise resources utilisation for the system as a whole and for each type of transmission. In particular, where the eMBB data whose resource is given to the URRLC service is punctured, this can lead to errors in decoding the eMBB data.

SUMMARY

The present disclosure can assist addressing or mitigating at least some of the issues discussed above.

Respective aspects and features of the present disclosure are defined in the appended claims.

From one perspective, there has been provided infrastructure equipment for use in a telecommunications system, the infrastructure equipment comprising: transceiver circuitry and control circuitry, whereby the transceiver circuitry, under control of the control circuitry, is configured to: transmit first data to a first mobile device and second data to a second mobile device, wherein the transmission period of the second data is shorter than the transmission period of the first data and the second data is transmitted after the start of the first data, and uses transmission resources allocated to, the first data; and transmit to the first mobile device, indication data that contains information identifying the resources allocated to the second data, wherein the granularity of the resources is determined in accordance with the first data.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLES

Figure 1:
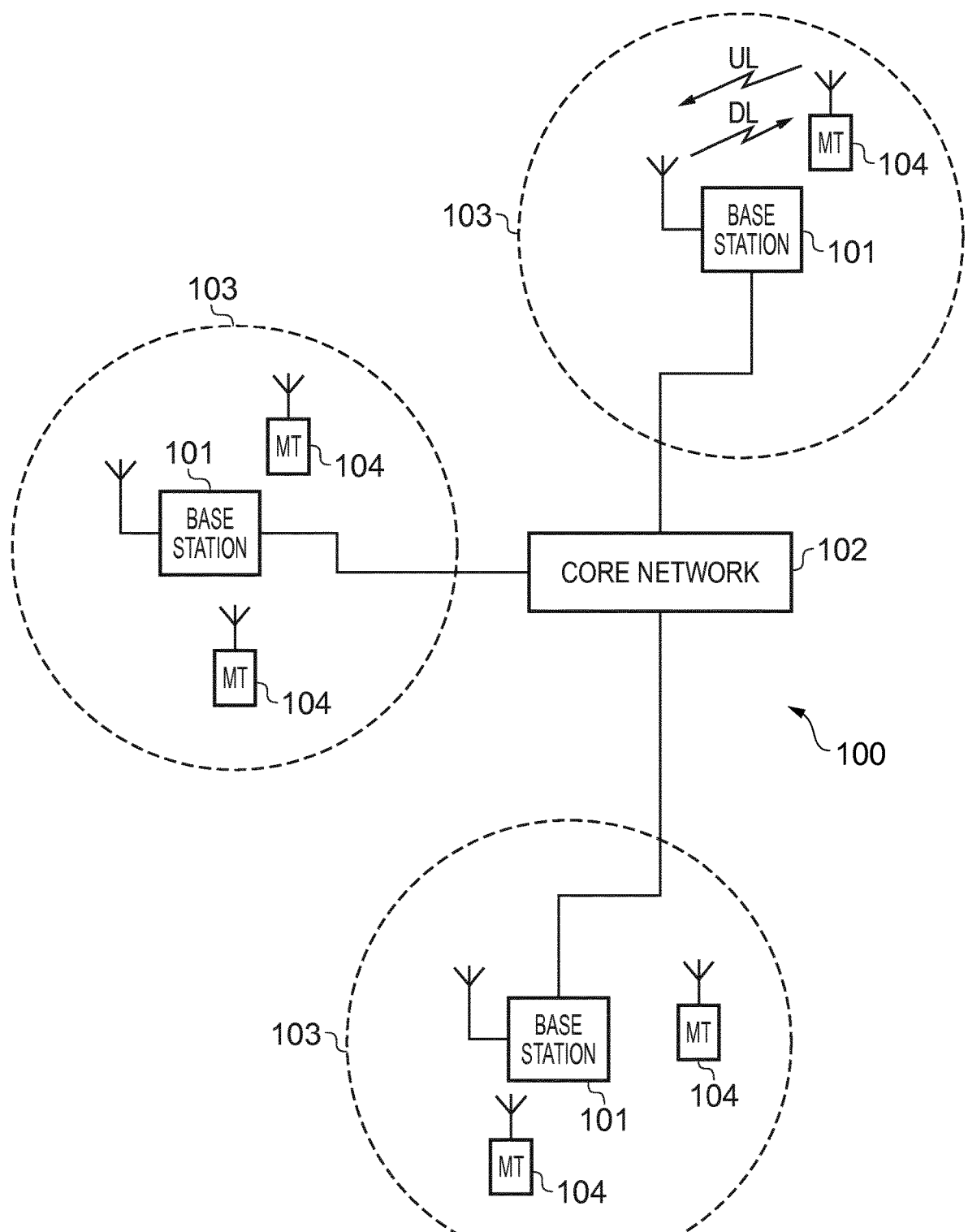
FIG. 1 schematically represents some elements of a conventional LTE-based mobile telecommunications network/system.

FIG. 1 is a schematic diagram illustrating a network architecture for an LTE-based wireless mobile telecommunications network/system 100. Various elements of FIG. 1 and their respective modes of operation are well-known and defined in the relevant standards administered by the 3GPP (RTM) body, and also described in many books on the subject, for example, Holma H. and Toskala A [3]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The network 100 includes a plurality of base stations 101 (sometimes referred to as "infrastructure equipment") connected to a core network 102. Each base station provides a coverage area 103 (i.e. a cell) within which data can be communicated to and from terminal devices 104 (sometimes referred to as "mobile terminals"). Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, mobile terminals, mobile devices and so forth. Base stations, which are an example of network infrastructure equipment may also be referred to as transceiver stations/nodeBs/enodeBs, infrastructure equipment, gNBs and so forth.

Figure 2:
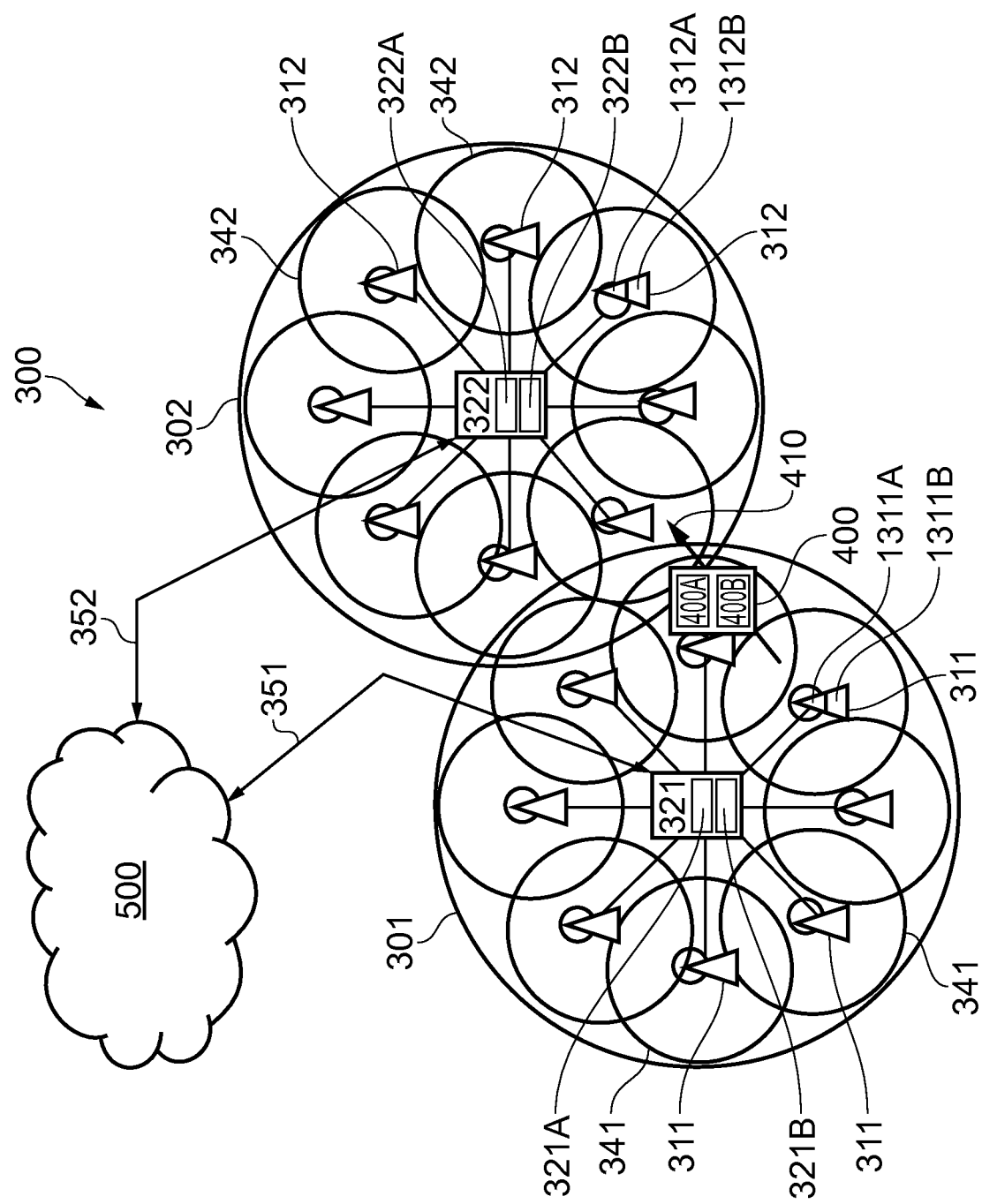
FIG. 2 schematically represents some elements of another type of wireless telecommunications network/system.

FIG. 2 is a schematic diagram illustrating a network architecture for a new RAT wireless mobile telecommunications network/system 300 based on previously proposed approaches and which may be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 500 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 500 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. For simplicity the present description assumes communications for a given terminal device are routed through one of the distributed units, but it will be appreciated in some implementations communications associated with a given terminal device may be routed through more than one distributed unit, for example in a soft handover scenario and other scenarios. That is to say, references herein to communications being routed through one of the distributed units should be interpreted as references to communications being routed through one or more of the distributed units. In this regard, the particular distributed units through which a terminal device is currently connected through to the associated controlling node may be referred to as active distributed units for the terminal device. The active subset of distributed units for a terminal device may comprise one or more than one distributed units (TRPs). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein for handling mobility/handovers in a wireless telecommunications system may also be applied in respect of wireless telecommunications systems having different architectures. That is to say, the specific wireless telecommunications architecture for a wireless telecommunications system adapted to implement functionality in accordance with the principles described herein is not significant to the principles underlying the described approaches.

The terminal device 400 comprises a transceiver unit 400A (which when embodied as circuitry may be referred to as "transceiver circuitry") for transmission and reception of wireless signals and a processor unit 400B configured to control the terminal device 400. The processor unit 400B (which when embodied as circuitry may be referred to as "control circuitry") may comprise various sub-units for providing functionality in accordance with embodiments of the present disclosure as explained further herein. These sub-units may be implemented as discrete hardware elements or as appropriately configured functions of the processor unit. Thus the processor unit 400B may comprise a processor unit which is suitably configured/programmed to provide the desired functionality described herein using conventional programming/configuration techniques for equipment in wireless telecommunications systems. The transceiver unit 400A and the processor unit 400B are schematically shown in FIG. 2 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the terminal device 400 will in general comprise various other elements associated with its operating functionality, for example a power source, user interface, and so forth, but these are not shown in FIG. 2 in the interests of simplicity.

The first and second controlling nodes 321, 322 in this example are functionally identical but serve different geographical areas (cells 301, 302). Each controlling node 321, 322 comprises a transceiver unit 321A, 322A (which when embodied as circuitry may be referred to as "transceiver circuitry") for transmission and reception of communications between the respective controlling nodes 321, 322 and distributed units 311, 312 within their respective communication cells 301, 302 (these communications may be wired or wireless). Each controlling node 321, 322 further comprises a processor unit 321B, 322B (which when embodied as circuitry may be referred to as "control circuitry") configured to control the controlling node 321, 322 to operate in accordance with embodiments of the present disclosure as described herein. The respective processor units 321B, 322B may again comprise various sub-units for providing functionality in accordance with embodiments of the present disclosure as explained herein. These sub-units may be implemented as discrete hardware elements or as appropriately configured functions of the processor unit. Thus, the respective processor units 321B, 322B may comprise a processor unit which is suitably configured/programmed to provide the desired functionality described herein using conventional programming/configuration techniques for equipment in wireless telecommunications systems. The respective transceiver units 321A, 322A and processor units 321B, 322B for each controlling node 321, 322 are schematically shown in FIG. 2 as separate elements for ease of representation. However, it will be appreciated the functionality of these units can be provided in various different ways, for example using a single suitably programmed general purpose computer, or suitably configured application-specific integrated circuit(s)/circuitry. It will be appreciated the controlling nodes 321, 322 will in general comprise various other elements, for example a power supply, associated with their operating functionality.

The respective distributed units (TRPs) 311, 312 in this example are functionally identical but serve different parts of their respective cells. That is to say, the distributed units are spatially distributed through their respective communication cells to support communications for terminal devices at different locations within the cells, as schematically indicated in FIG. 2. Each distributed unit 311, 312 comprises a transceiver unit 1311A, 1312A (which when embodied as circuitry may be referred to as "transceiver circuitry") for transmission and reception of communications between the respective distributed units 311, 312 and their associated controlling node 321, 322 and also for transmission and reception of wireless radio communications between the respective distributed units 311, 312 and any terminal device they are currently supporting. Each distributed unit 311, 312 further comprises a processor unit 1311B, 1312B (which when embodied as circuitry may be referred to as "control circuitry") configured to control the operation of the distributed unit 311, 312 in accordance with the principles described herein. The respective processor units 1311B, 1312B of the distributed units may again comprise various sub-units. These sub-units may be implemented as discrete hardware elements or as appropriately configured functions of the processor unit. Thus, the respective processor units 1311B, 1312B may comprise a processor unit which is suitably configured/programmed to provide the desired functionality described herein using conventional programming/configuration techniques for equipment in wireless telecommunications systems. The respective transceiver units 1311A, 1312A and processor units 1311B, 1312B are schematically shown in FIG. 2 as separate elements for ease of representation. However, it will be appreciated the functionality of these units can be provided in various different ways, for example using a single suitably programmed general purpose computer, or suitably configured application-specific integrated circuit(s)/circuitry. It will be appreciated the distributed units 311, 312 will in general comprise various other elements, for example a power supply, associated with their operating functionality.

Generally, the infrastructure equipment with which the mobile device communicates (examples of the infrastructure equipment being the controlling nodes or the TRPs) may be referred to as the gNodeB, gNB or the like in 5G terminology.

As discussed above, mobile communications networks such as network 100 or network 300 may be used to carry transmissions for services with a variety of constraints, such as traffic which are high capacity and have some tolerance to delay and traffic which is low capacity but with a low tolerance to delay. While the principles of the disclosure will be illustrated in the context of a mobile network where a network element (e.g. TRP, eNB, BTS, . . . ) transmits eMBB and URLLC data to a mobile unit, it will be appreciated that the same principles apply to 3G networks, LTE networks or any other suitable network and to any appropriate type or types of data. Likewise, the same principles and teachings can also be used for uplink transmissions from a mobile device to a network receiver (e.g. BTS, eNB, TRP, etc.).

Figure 3:
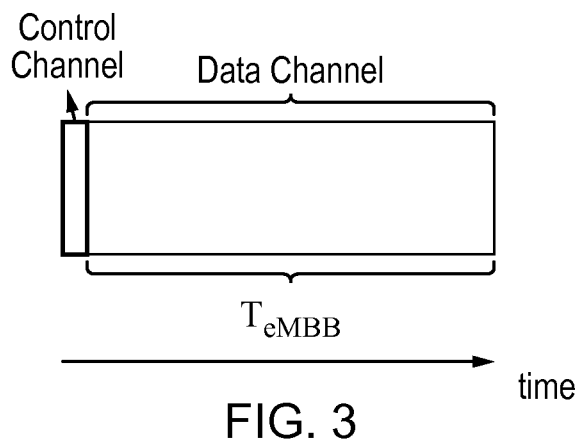
FIG. 3 schematically represents an example eMBB transmission in accordance with the present disclosure.
Figure 4:
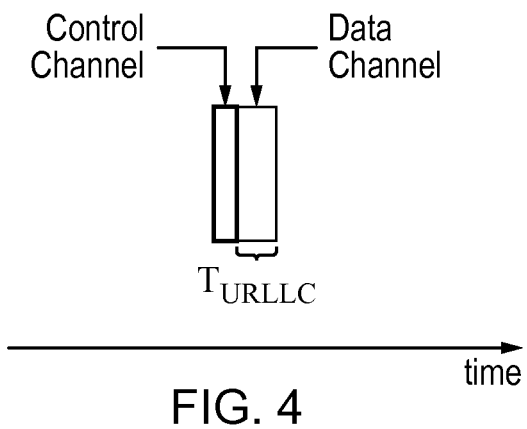
FIG. 4 schematically represents an example URLLC transmission in accordance with the present disclosure.

Returning to the example of eMBB and URLLC traffic, examples of suitable subframe structures for sending eMBB data and URLLC data are illustrated in FIGS. 3 and 4 respectively. It is noteworthy that while the present disclosure is generally provided referring to subframes, the same teachings apply in respect of frames, slots or of any other suitable time unit. In addition, although the description relates to eMBB and URLLC traffic, the disclosure is not so limited. For example, the disclosure is pertinent where the transmission period of the second data (the URLLC in embodiments) is shorter than the transmission period of the first data (the eMBB in embodiments) and the second data is transmitted after, and uses the resources allocated to, the first data. Indeed, the second data may be additionally any kind of low latency data and the first data may be any kind of high capacity resource and not limited to URLLC and eMBB data respectively.

Returning to the specific examples, an example eMBB subframe structure is shown in FIG. 3 with transmission period $T_{eMBB}$ (e.g. 0.5 ms, 1 ms, 5 ms, 10 ms or 50 ms), where the control channel uses significantly smaller transmission resources than that of the data channel. In this manner, the overhead caused by control transmissions is reduced. On the other hand, if new URLLC data to be sent is identified or received for transmission once the transmission of an eMBB subframe has already started, it would have to be sent in a future subframe which may lead to a delay in transmitting this data. Namely, the delay would be of at least the remaining transmission time for the current eMBB subframe which may create a delay that is not acceptable to the URLLC transmission. Presented differently, as a trade-off for the lower overhead, the transmission delay for longer subframes is increased compared to the transmission delay for shorter subframes. This example eMBB subframe is thus well adapted to the transmission of relatively high capacity and high delay tolerance traffic (e.g. streaming of video, web traffic, etc.).

Now turning to FIG. 4, an example of a URLLC subframe structure is illustrated with a transmission period of $T_{URLLC}$ (e.g. 0.25 ms), where the control and data channels occupy a short duration of time compared to the subframe illustrated in FIG. 3. The transmission length of URLLC data $T_{URLLC}$ is expected to be much smaller than that of eMBB $T_{eMBB}$, that is, $T_{eMBB} \gg T_{URLLC}$. An example requirement currently considered for URLLC is a low latency transmission measured from the ingress of a layer 2 packet to its egress from the network, with a proposed target of 1 ms. With such a subframe structure and compared to that of FIG. 3, the overhead created by the transmission of control information is greater but if new data is received during the transmission of a current subframe, a new subframe can be sent quicker (as the transmission of the current subframe will finish earlier than for a longer subframe) and thus the delay for sending data is relatively smaller. As the skilled person will appreciate, this type of subframe is better adapted for sending low capacity traffic that is sensitive to delay (e.g. emergency and safety systems, health monitoring, control of autonomous vehicles, gaming etc.), in accordance with the expected low delay requirements for URLLC traffic, than for sending high capacity and high delay-tolerant traffic.

Figure 5:
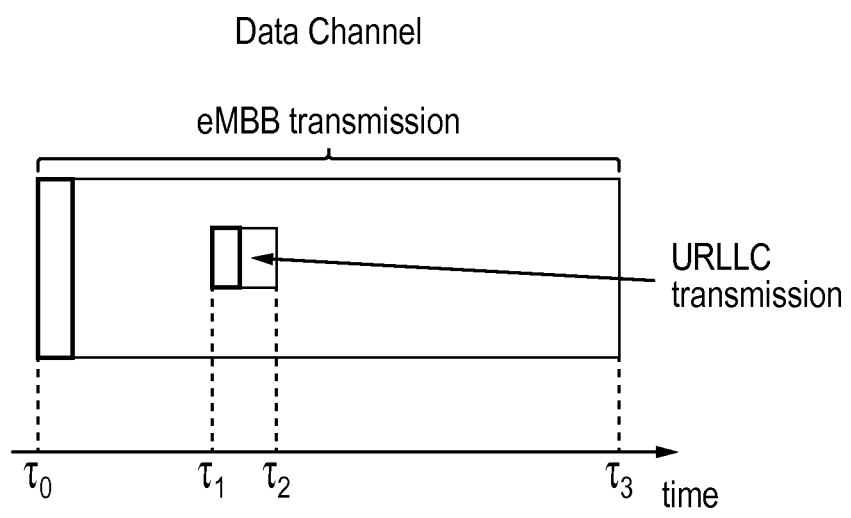
FIG. 5 schematically represents an example multiplexing of eMBB and URLLC transmissions.

Since URLLC is intolerant to latency, it is agreed that URLLC can occupy a subset of the resources that have been allocated to another eMBB UE in the downlink. For example in FIG. 5, an eMBB transmission started at time $\tau_0$, and occupies all available transmission resources until time $\tau_3$. At time $\tau_1$, an URLLC packet arrives and it needs to be transmitted immediately. If there are no other available transmission resources, it would occupy a portion of the eMBB resources as shown in FIG. 5 until time $\tau_2$.

There are 3 proposed features in 3GPP that are related to the downlink pre-emption of eMBB resources by a URLLC transmission; namely, the pre-emption indicator, subsequent retransmission and code block group (CBG) transmission. These will be described below.

Pre-Emption Indicator

Figure 6:
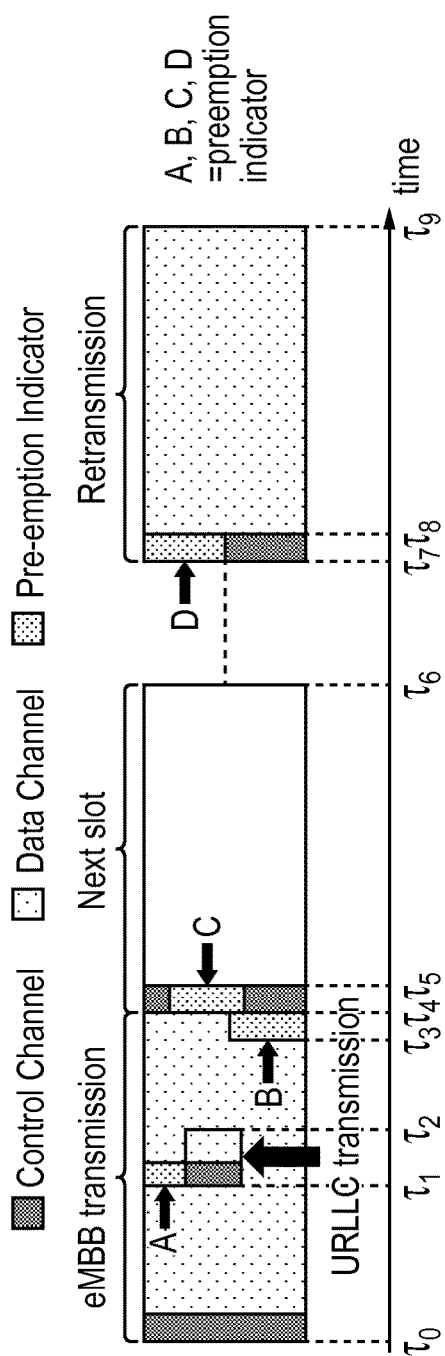
FIG. 6 illustrates an example of the location of the pre-emption indicator.

It is agreed in 3GPP that a pre-emption indicator is transmitted to the UE where this pre-emption indicator contains information on which portion of the eMBB transmission has been punctured by URLLC. The pre-emption indicator has been described in co-pending European patent application EP16189083.5 filed on 15 Sep. 2016 whose content is incorporated herein by reference. This would allow the UE to puncture out the affected portion of the transmission (i.e. zero out the corresponding LLRs) and would improve the decoding of the eMBB transmission. The proposed locations for this pre-emption indicator are shown in FIG. 6 as A, B, C and D (although it is appreciated that not all of these locations may ultimately be desired):

A: This is known as a current indicator where the pre-emption indicator is transmitted at the same time as the URLLC transmission. The eMBB UE would be required to continuously monitor for this indicator B: This is known as a post indicator where the pre-emption indicator is transmitted at the end of the eMBB transmission but is still contained within the eMBB transmission slot or frame. The eMBB UE need only monitor for this indicator once per eMBB transmission.

C: This is also another form of post indicator where the pre-emption indicator is transmitted at the beginning of the next slot. This indicator is transmitted in the control channel (e.g. PDCCH) of the next slot and consumes PDCCH resources, which may lead to blocking of PDCCH resources. The eMBB UE may or may not be configured to monitor the PDCCH in the next slot but for this case the UE will monitor PDCCH in the next slot regardless.

D: The pre-emption indicator is only transmitted after the UE feedbacks a HARQ NACK to the gNB. The pre-emption indicator is transmitted in the control channel (PDCCH) that schedules the retransmission.

Subsequent Retransmission

Figure 7:
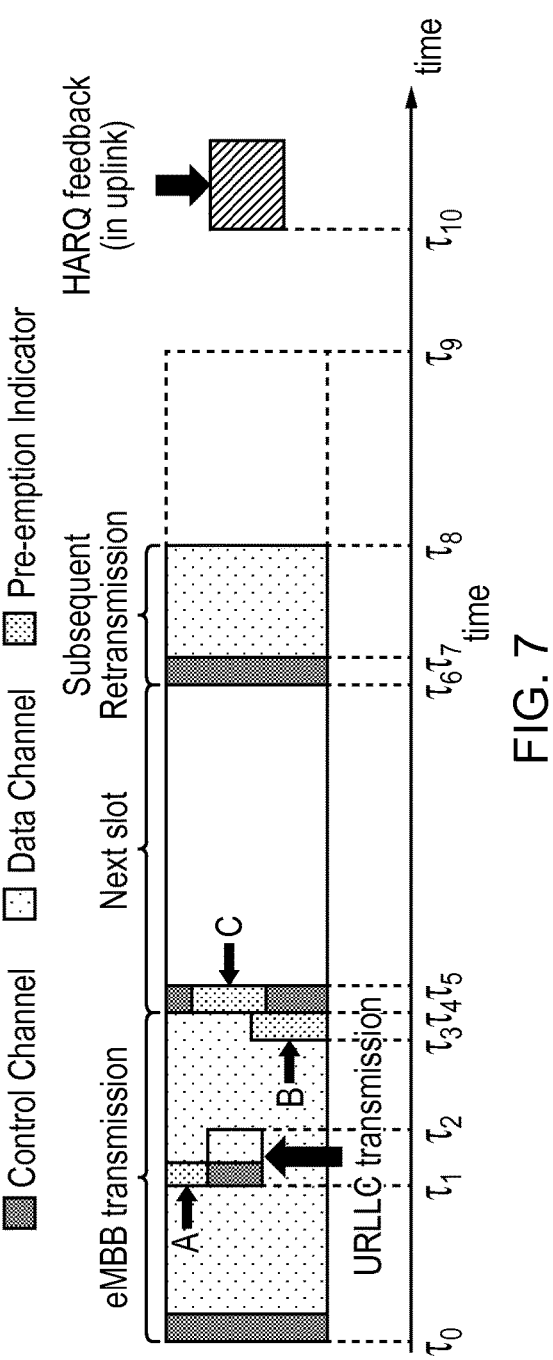
FIG. 7 illustrates an example of subsequent retransmission according to the present disclosure.

It is also proposed in 3GPP to transmit a subsequent retransmission after the pre-empted eMBB transmission but before the UE performs Hybrid Automatic Retransmission Request (HARQ) feedback to the gNB as shown in FIG. 7. The subsequent retransmission only transmits a portion of the eMBB data. In embodiments, to reduce data transmission, this may be only the portion that has been pre-empted by URLLC. This is beneficial if the gNB deemed that the puncturing of the eMBB by the URLLC transmission is too large such that the eMBB UE is unable to recover the eMBB transmission with just the pre-emption indicator alone. The subsequent retransmission can be in the next immediate slot e.g. starting at time $\tau_4$ or it can be in another slot, e.g. at time $\tau_6$.

Subsequent re-transmission is discussed in co-pending European patent application EP16191978.2 filed on 30 Sep. 2016 whose content is incorporated herein by reference. When there is a subsequent retransmission, the timeline for the HARQ feedback can be extended to give the UE additional time to exploit the retransmitted information in the decoding. This aspect is covered in co-pending European patent application EP17155750.7 filed on 10 Feb. 2017 whose content is incorporated herein by reference.

Code Block Group

Figure 8:
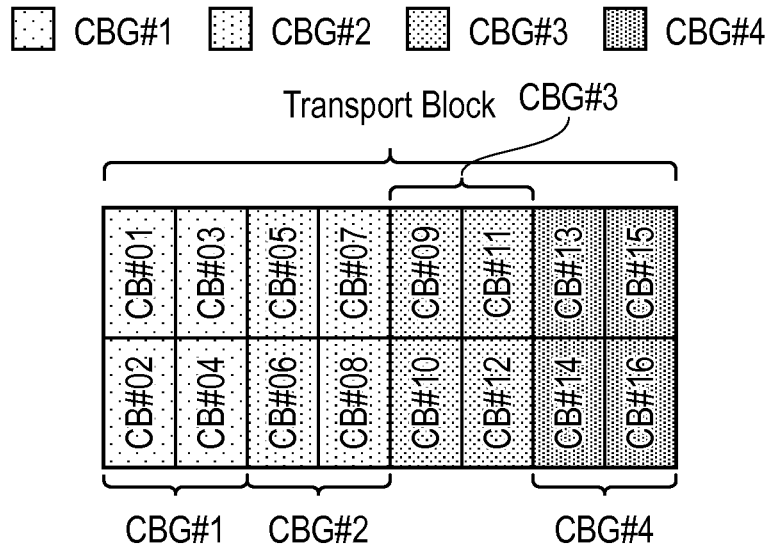
FIG. 8 illustrates an example of a Code Block and Code Block Group of a Transport Block.

It is agreed in 3GPP that a Transport Block (TB) can be divided into multiple Code Blocks (CB) where each CB incorporates a CRC check and is independently coded within the transport forward error correction code as shown in FIG. 8, where the TB is divided into 16 CBs, i.e. CB #01 to CB #16. The receiver can then decode each CB separately and check its CRC to determine an ACK/NACK for the CB. Large amounts of UpLink (UL) resources would be required for transmitting an ACK/NACK per CB in a case where there are many CBs per TB. The required UL resources can be reduced by combining CBs into groups, i.e. a Code Block Group. A Code Block Group (CBG) consists of one or more CBs, in the example in FIG. 8, a CBG consists of 4 CBs and there are 4 CBGs in the TB. Instead of transmitting a single HARQ ACK/NACK for the entire TB as per legacy system, the mobile device would feedback multiple HARQ ACK/NACKs, one for each CBG, i.e. in this example the mobile device would feedback 4 HARQ ACK/NACKs. This is significantly less than the 16 needed if feedback was per CB. If any of the CBs in a CBG fails the CRC check, then a NACK would be sent for that CBG otherwise an ACK will be transmitted.

The gNB would then retransmit only the CBG that has been NACKed by the mobile device. In this way the resources for retransmission are reduced which can be significant for an eMBB type transmission.

An alternative to appending a CRC to each code block within a code block group and reporting NACK for the CBG if one or more CBs fails the CRC check is to apply a CRC to the CBG as a whole (where individual CBs do not necessarily support their own CRC). The retransmission functionality described above is also applied in this case.

Since the network would need to address a CB or CBG in a DCI, a possible granularity of the punctured (i.e. pre-empted) resource is a CB or CBG, which would lead to a common design for all indicators. However, the granularity of the punctured resource and/or of the subsequent retransmission has not been discussed in detail. The inventors have identified that this may be an issue since if one or more code blocks are punctured, it is impossible to decode those one or more code blocks and the transport block as a whole may be undecodable.

Generally, and in one embodiment, this problem is addressed by providing at least infrastructure equipment for use in a telecommunications system, the infrastructure equipment comprising: transceiver circuitry and control circuitry, whereby the transceiver circuitry, under control of the control circuitry, is configured to: transmit first data (eMBB) to a first mobile device and second data (URLLC) to a second mobile device, wherein the transmission period of the second data is shorter than the transmission period of the first data and the second data is transmitted after, and uses the resources allocated to, the first data; and transmit to the first mobile device, indication data that contains information identifying the resources allocated to the second data, wherein the granularity of the resources is determined in accordance with the first data.

To put it another way, the resource granularity of the pre-emption indicator is a function of a characteristic of the transmission during the eMBB slot.

As will be appreciated, from the perspective of the first mobile device, the URLLC is punctured data. If the first mobile device knows it is punctured data, the first mobile device will then take steps to zero out these bits rather than include them (which acts as corruptions/intereference/noise) in the decoding.

In an embodiment, the function is a percentage of the size of the eMBB transmission, e.g. the TBS or the number of Resource Elements (RE) occupied by the eMBB transmission. Specifically, the granularity is a percentage $X_G$% of the size of the eMBB transmission. Although the foregoing mentions size as meaning the TBS or the number of REs occupied by the eMBB transmission, the disclosure is not so limited. For example, the term size includes and is not limited to time resources; frequency resources; time and frequency resources; transport block size; code block size; CBG size or the like.

A benefit of using a percentage of the eMBB size allows the granularity to be scaled according to the eMBB transmission without increasing the number of bits required to indicate the punctured resource. This is in contrast to the situation where the CBG is typically of a fixed size for all eMBB transmissions.

Figure 9:
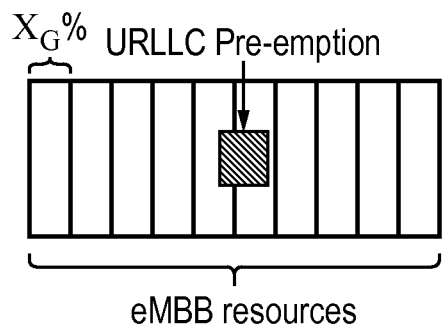
FIG. 9 illustrates an example of granularity as a percentage $X_G$ % of the eMBB resource according to embodiments of the disclosure.

For example in FIG. 9, $X_G$=10% and the eMBB resource is divided into 10 Puncturing Portions. Here an URLLC transmission pre-empted the 5th and 6th Puncturing Portions of the eMBB and the indicator can indicate the start of the pre-emption and the number of Puncturing Portions that the pre-emption occupies, i.e. here it is the 5th Puncturing Portion and occupies 2 Puncturing Portions. The pre-emption indicator may indicate that the $5^{th}$ puncturing portion is pre-empted and that 2 puncturing portions are used. In order to use the same number of bits of indication, the number of puncturing portions being punctured can be limited, for example to half of the total puncturing portions. For example, in the example in FIG. 9, there are 10 possible starting puncturing portions but we can have a maximum of 5 puncturing portions being pre-empted. This recognises that if the number of puncturing portion exceeds a certain percentage (e.g. 50%) then the eMBB transmission is beyond repair and so indicating more than 50% of resources being punctured would not recover the eMBB transmission. It should be appreciated this is just an example implementation of the embodiment and does not limit the number of puncturing portion that can be indicated in an actual implementation.

In this embodiment, the pre-emption signalling can be significantly reduced by mandating that URLLC pre-emption may start only immediately after the boundary of two Puncturing Portions. This has the effect of increasing the URLLC latency by an amount bounded by the duration of a Puncturing Portion.

Of course, the pre-emption signalling may instead include the actual puncturing portions that are occupied. This would allow non-consecutive puncturing portions to be occupied.

Although the aforesaid example is 10%, the disclosure is not so limited. For example, $X_G$ may be any value, for example, 5%, 6.25% (1/16 which can be indicated with exactly 4 bits) or 15% or the like. The value of $X_G$ may be provided by the network on a case-by-case basis or may be provided in the Standard. The value of $X_G$ may therefore be provided in signalling to the mobile device or may be stored within the mobile device if part of the Standard. In examples, the value of $X_G$ may be provided by the gNB using Radio Resource Control (RRC) signalling.

In some embodiments, the value of $X_G$ may vary depending on the resilience of the error correction. For example, where robust error correction is used for the eMBB, the granularity may be higher than where less robust error correction is used.

In another embodiment, the granularity is a function of the eMBB code rate. That is the percentage $X_G$ is a function of the eMBB code rate. This embodiment recognizes that the amount of puncturing that a TB can tolerate is dependent upon the code rate used on the TB. A low code rate would be able to tolerate a higher percentage of puncturing than a high code rate. A lookup table or a predefined function between $X_G$ and code rate can be specified in the specifications where $X_G$ is larger for a lower code rate and smaller for a higher code rate.

In another embodiment, the granularity is the size of a typical URLLC transmission. In this example, the URLLC transmission is made of code words and the granularity is the size of one of those code words. In other words, a typical URLLC transmission can be the smallest URLLC transmission. The URLLC transmission may be likely to occupy a large frequency bandwidth but a small time resource and so the granularity can be the number of OFDM symbols occupied by the said typical URLLC transmission.

In another embodiment, the Puncturing Portion is aligned with the start of URLLC transmissions. If the granularity is the size of a URLLC transmission then the URLLC would puncture just one Puncturing Portion.

In another embodiment, the length in time of a Puncturing Portion is a multiple of the period of a URLLC transmission. This would avoid the case where the URLLC would puncture two Puncturing Portions as shown in FIG. 9, i.e. a Puncturing Portion would contain a URLLC pre-emption and the pre-emption indicator need only indicate which Puncturing Portion has been pre-empted (rather than needing to indicate multiple Puncturing Portions such as the start and end as in FIG. 9).

In another embodiment, the granularity is a percentage of the size of the CB or CBG. It is possible that the CB and CBG size can vary depending on configuration and so the granularity would also change depending upon the size of the CB and CBG.

In another embodiment, if the number of Puncturing Portions being pre-empted by a URLLC transmission is higher than a predefined threshold the pre-emption indicator is not transmitted.

In another embodiment, if the number of Puncturing Portions being pre-empted by a URLLC transmission is higher than a predefined threshold, a subsequent retransmission is transmitted to the mobile device. This threshold can be set taking into account the TB effective code rate.

In another embodiment, the pre-emption indicator also indicates whether a subsequent retransmission will be scheduled. This can be a single bit to tell the UE whether to monitor for a subsequent retransmission or not.

More generally, provided in this embodiment is infrastructure equipment for use in a telecommunications system, the infrastructure equipment comprising: transceiver circuitry and control circuitry, whereby the transceiver circuitry, under control of the control circuitry, is configured to: transmit first data to a first mobile device and second data to a second mobile device, wherein the transmission period of the second data is shorter than the transmission period of the first data and the second data is transmitted after, and uses the resources allocated to, the first data; transmit to the first mobile device re-transmit data that contains information indicating that retransmission of the first data whose resources were allocated to the second data will take place after the transmission of the first data.

This recognizes that:
  the mobile device may not monitor for PDCCH at every slot (e.g. due to DRX and the periodicity of the PDCCH search space for that mobile device) and hence the mobile device would typically not monitor for PDCCH after the eMBB transmission until the next monitoring period.
  the Downlink Control Indicator (DCI) used for a subsequent retransmission may be different to that for a normal eMBB transmission. Hence the re-transmit data (indicator) causes the mobile device to monitor for DCI formats for a subsequent retransmission in addition to those for a normal eMBB transmission
  the total number of blind decoding candidates can remain unchanged and when this retransmit data (indication) is received, the mobile device reassigns its DCI decoding functionality to decode a proportion of candidates as "subsequent retransmission DCI" and a proportion of candidates as "normal eMBB transmission DCI"

Figure 10:
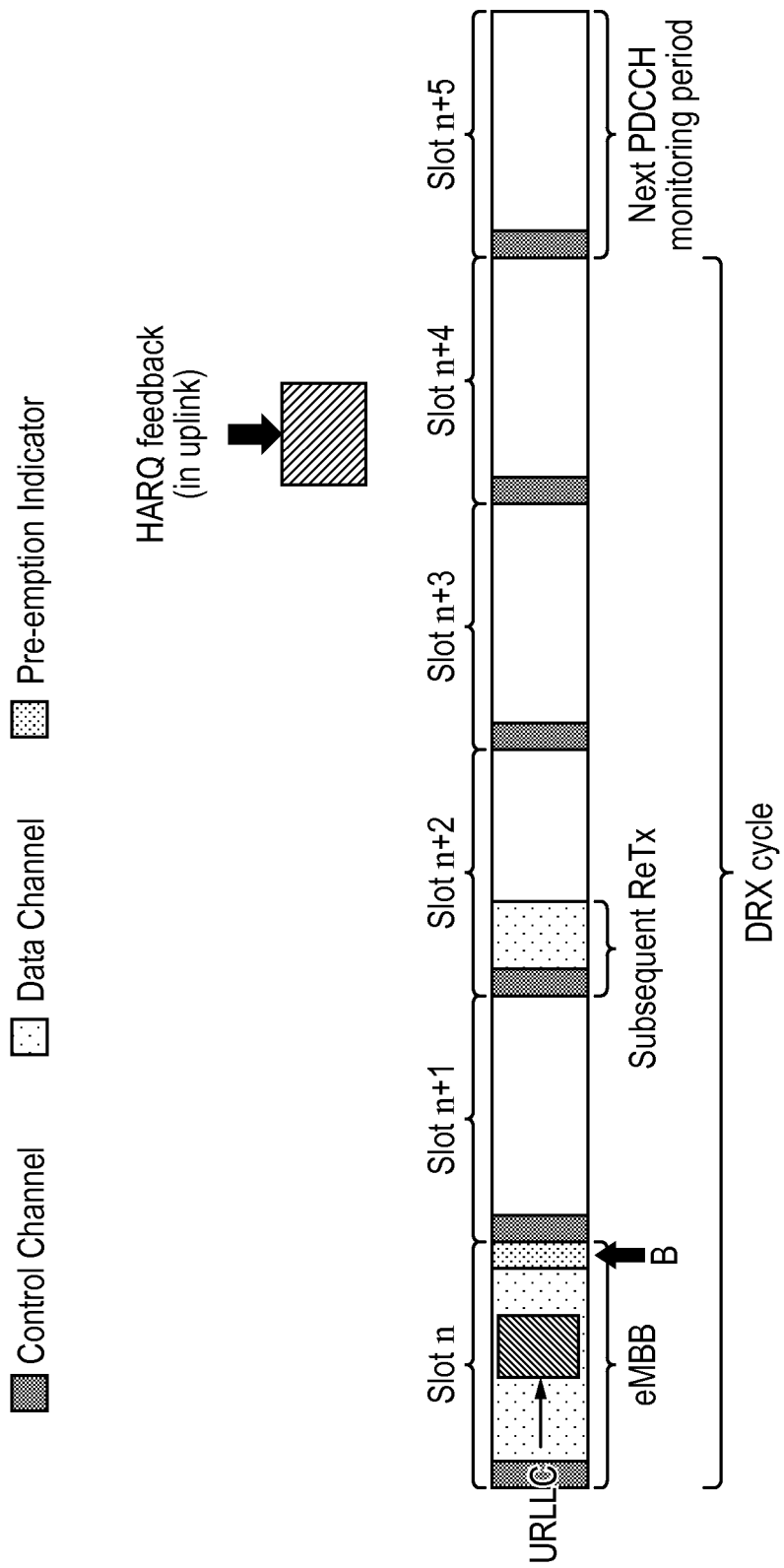
FIG. 10 illustrates an example of monitoring for subsequent retransmission according to the present disclosure.

This indication (sent as re-transmit data) to monitor for subsequent retransmission would therefore allow the gNB to schedule the subsequent retransmission in any slot after the eMBB transmission and before the HARQ feedback. An example is shown in FIG. 10 where the mobile device monitors for PDCCH with a period of every 5 slots and would go to sleep in between PDCCH monitoring periods. At Slot n, the mobile device is scheduled an eMBB transmission which is later pre-empted by a URLLC transmission for another mobile device.

A pre-emption indicator is transmitted at the end of Slot n to tell the mobile device which Puncturing Portions have been pre-empted and as per this embodiment, it also tells the mobile device that a subsequent retransmission will be scheduled. Hence instead of going back to sleep after receiving the eMBB, the mobile device would stay awake and monitor Slot n+1 till Slot n+3, i.e. slots before the mobile device has to transmit a HARQ feedback, to monitor for a subsequent retransmission. In this example the subsequent retransmission is transmitted in Slot n+2. In slot n+1 till slot N+3, the UE monitors DCI format(s) that can indicate a subsequent retransmission.

In another embodiment, the pre-emption indicator instructs the mobile device to start monitoring for subsequent retransmission after a delay. Using the example in FIG. 10, the network (for example, the gNB) may know that it has already used up resources in Slot n+1 for other mobile devices and so there is no point for the mobile device to monitor for subsequent retransmission in Slot n+1 but rather start monitoring from Slot n+2 onwards. That is here the gNB indicates a delay of 1 slot after end of Slot n (eMBB transmission) to start monitoring for subsequent retransmission. It should be appreciated that other delays (apart from 1 slot) can be indicated. Another way to view this is that the pre-emption indicator may also instruct the mobile device when not to monitor for subsequent retransmission. In the above case, the gNB may instruct the mobile device not to monitor the Slot n+1 for possible subsequent retransmissions (although the mobile device may monitor for normal eMBB transmissions/re-transmissions in that slot).

In another embodiment the minimum granularity of subsequent retransmission is the same as the minimum granularity that can be signalled using the pre-emption indicator. Since subsequent retransmissions transmit only the portion that is pre-empted it would save resources for retransmission if this retransmission occupies resources that are as close as possible to the size of the pre-empted portions and so at the minimum it should be the granularity used by the pre-emption indicator. It should be appreciated that the granularity of the subsequent retransmission and pre-emption indicator need not be the same.

In an embodiment, the DCI format of the pre-emption indicator is a function of the eMBB transmission. For example, when the granularity of the pre-emption indicator is a percentage of the CB size, the number of bits required to indicate pre-emption depends on the number of CBs within the eMBB transmission. In this case, larger eMBB transmissions would require a greater number of bits within the pre-emption indicator. The mobile device can determine the format of the pre-emption indicator that it should blind decode for based on the known size of the eMBB transmission. The mobile device can also determine the amount of physical resource used to transmit the pre-emption indicator as a function of the known size of the eMBB transmission (e.g. the aggregation level of the pre-emption indicator may be larger for DCI formats carrying larger numbers of bits). The format of the DCI carrying the pre-emption indicator can also be indicated in the DCI scheduling the eMBB transmission.

Figure 11:
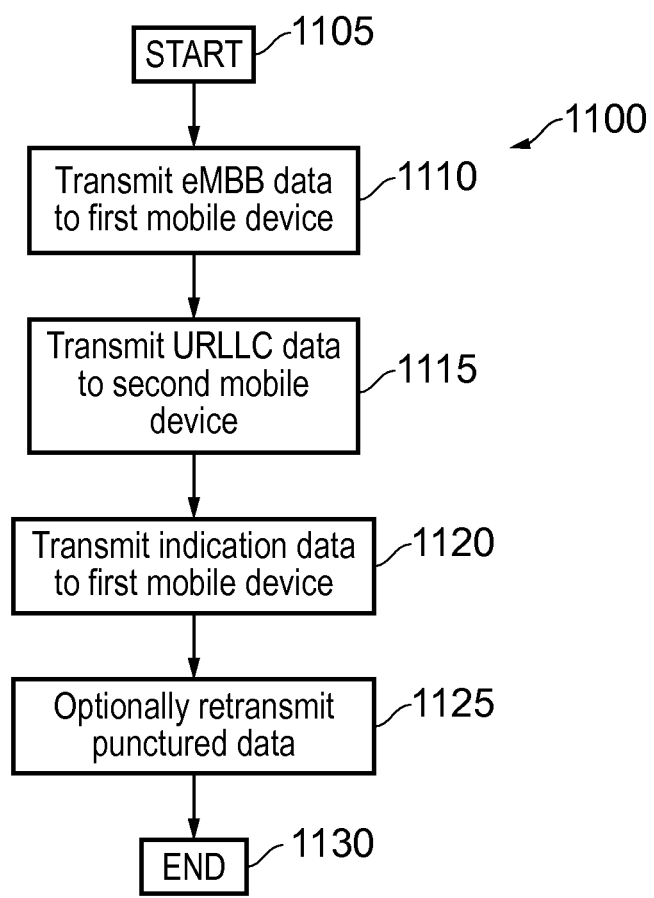
FIG. 11 is a flow chart explaining the process according to one embodiment in the infrastructure equipment.

- More than one pre-emption indicator can be sent to the mobile device per subframe in order to account for the cases where there is more than one URLLC transmission that afflicts the eMBB transmission
- A single URLLC transmission may pre-empt more than one code block (or more than one CBG) within the eMBB transmission. In this case, a pre-emption indicator can be transmitted per afflicted CB or per afflicted CBG FIG. 11 shows a flow chart 1100 explaining one embodiment taking place in the gNB. The process starts at step 1105. The process moves to step 1110 where the eMBB data is transmitted to the first mobile device. The process moves to step 1115 where the URLLC data is transmitted to the second mobile device. The process moves to step 1120 where the indication data is sent to the first mobile device. The indication data is the pre-emption indication signal described above and that is indication data that contains information identifying the resources allocated to the second data, wherein the granularity of the resources is determined in accordance with the first data. The granularity is determined in accordance with the examples described above.

The process then moves to step 1125 where, optionally, the eMBB data whose resources were used to transmit the URLLC data to the second mobile device may be retransmitted. In other words, the eMBB punctured data may be retransmitted in step 1125.

The process ends in step 1130.

Figure 12:
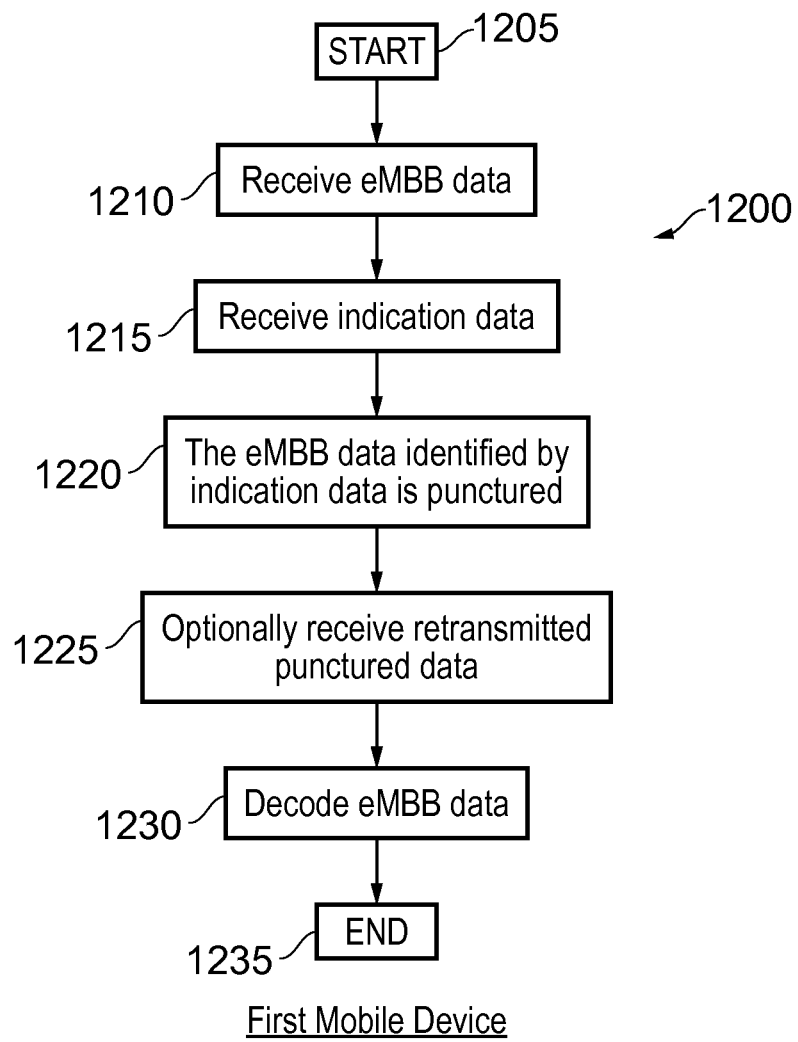
FIG. 12 is a flow chart explaining the process according to one embodiment in the first mobile device.

FIG. 12 shows a flow chart 1200 explaining one embodiment taking place in the first mobile device. The process starts at step 1205. The first mobile device receives the eMBB data at step 1210. The indication data is then received by the first mobile device in step 1215. The eMBB data which was identified by the indication data is punctured. In other words, the resources that were initially assigned to the first mobile device for eMBB data and were subsequently used to transmit the URLLC data is ignored in the first mobile device. This is step 1220.

The process moves to step 1225 where, optionally, the punctured data is retransmitted by the gNB. The process moves to step 1230 where the eMBB data is decoded. The process ends in step 1235.

Figure 13:
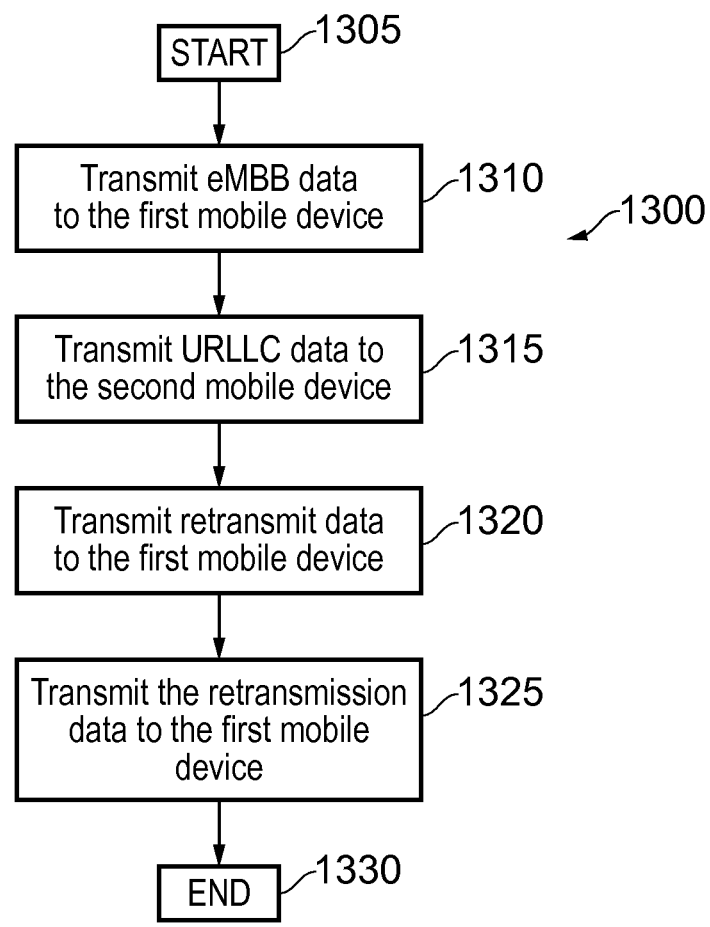
FIG. 13 is a flow chart explaining the process according to one embodiment in the infrastructure equipment.

FIG. 13 shows a flow chart 1300 explaining another embodiment taking place in the gNB. The process starts in step 1305. The process moves to step 1310 where the eMBB data is transmitted to the first mobile device. The process moves to step 1315 where the URLLC data is transmitted to the second mobile device. The process moves to step 1320 where the retransmit data is sent to the first mobile device. This retransmit data may form part of the pre-emption indicator or may be separate to the pre-emption indicator. The retransmit data contains information indicating that retransmission of the first data whose resources were allocated to the second data will take place after the transmission of the first data.

The process moves to step 1325 where the retransmission data (that is the eMBB data whose resources were used to transmit the URLLC data) are transmitted to the first mobile device at a time indicated in the retransmit data. The re-transmit data may indicate a time window in which the subsequent retransmission could be transmitted.

The process then ends in step 1330.

Figure 14:
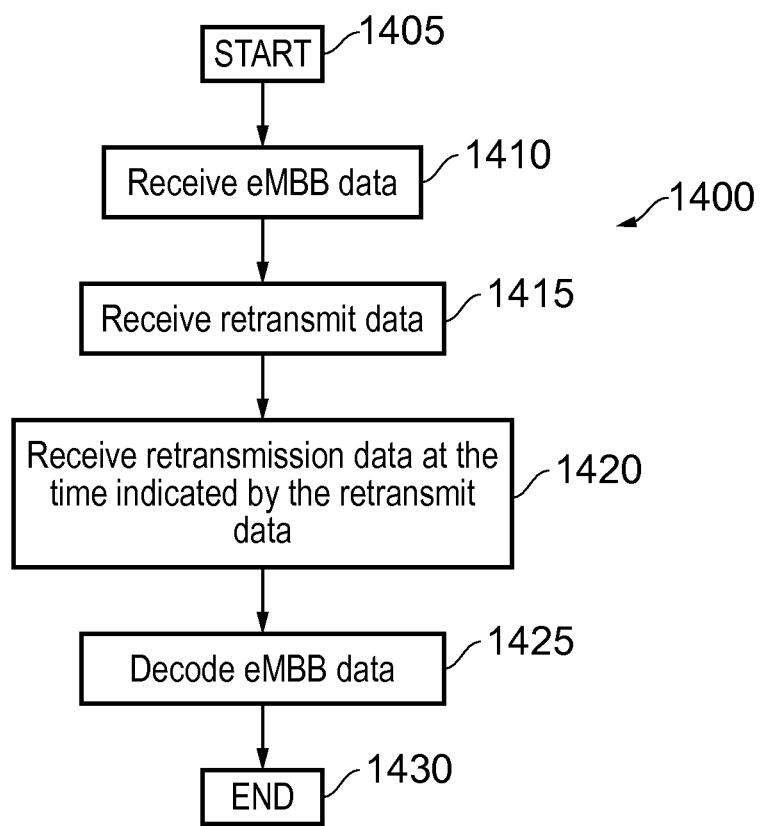
FIG. 14 is a flow chart explaining the process according to one embodiment in the mobile device.

FIG. 14 shows a flow chart 1400 explaining another embodiment taking place in the first mobile device.

The process starts in step 1405. The first mobile device receives the eMBB data at step 1410. The retransmit data is then received by the first mobile device in step 1415.

This retransmit data may form part of the pre-emption indicator or may be separate to the pre-emption indicator. The retransmit data contains information indicating that retransmission of the first data whose resources were allocated to the second data will take place after the transmission of the first data.

The process moves to step 1420 where the retransmission data (that is the eMBB data whose resources were used to transmit the URLLC data) are received by the first mobile device at a time indicated in the retransmit data. The re-transmit data may indicate a time window in which the subsequent retransmission could be transmitted.

The eMBB data is decoded by the first mobile device in step 1425 and the process ends in step 1430.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely illustrative embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

In the present disclosure, method steps discussed herein may be carried out in any suitable order and not necessarily in the order in which they are listed. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously (entirely or in part) or in the same order. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered. For example transmitting a message may involve using several resource elements in an LTE environment such that several signals at a lower layer correspond to a single message at a higher layer. Also, transmissions from one terminal to another may relate to the transmission of any one or more of user data, discovery information, control signalling and any other type of information to be transmitted.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example any one or more of a mobile terminal, a base station or any other mobile unit may be configured accordingly if appropriate, so long as it is technically feasible and not explicitly excluded.

Whenever the expressions "greater than" or "smaller than" or equivalent are used herein, it is intended that they discloses both alternatives "and equal to" and "and not equal to" unless one alternative is expressly excluded or is not technically relevant.

It is noteworthy that even though the present disclosure has been discussed in the context of LTE and/or 5G, its teachings are applicable to but not limited to LTE, 5G or to other 3GPP standards. In particular, even though the terminology used herein is generally the same or similar to that of the 5G standards, the teachings are not limited to the present version of 5G and could apply equally to any appropriate arrangement not based on 5G and/or compliant with any other future version of an 5G or 3GPP or other standard.

Respective features of the present disclosure are defined by the following numbered examples:

1. Infrastructure equipment for use in a telecommunications system, the infrastructure equipment comprising:
   transceiver circuitry and control circuitry, whereby the transceiver circuitry, under control of the control circuitry, is configured to:
   transmit first data to a first mobile device and second data to a second mobile device, wherein the transmission period of the second data is shorter than the transmission period of the first data and the second data is transmitted after the start of the first data, and uses transmission resources allocated to, the first data; and
   transmit to the first mobile device, indication data that contains information identifying the resources allocated to the second data, wherein the granularity of the resources is determined in accordance with the first data.

2. Infrastructure equipment according to paragraph 1, wherein the granularity of the resources is determined in accordance with the size of the first data.

3. Infrastructure equipment according to paragraph 2, wherein the granularity of the resources is a percentage of the size of the first data.

4. Infrastructure equipment according to any preceding paragraph 1, wherein the granularity of the resources is determined in accordance with the code rate of the first data.

5. Infrastructure equipment according to paragraph 4, wherein the granularity of the resources is a function of the code rate of the first data.

6. Infrastructure equipment according to any preceding paragraph, wherein the second data is formed of symbols and the granularity of the resources is the smallest number of symbols that can be occupied by the second data.

7. Infrastructure equipment according to paragraph 6, wherein the granularity of the resources allocated to the second data is temporally aligned to the start of the transmission of the second data.

8. Infrastructure equipment according to any preceding paragraph, wherein the granularity of the resources allocated to the second data is a multiple of the minimum of the size of the second data.

9. Infrastructure equipment for use in a telecommunications system, the infrastructure equipment comprising:
   transceiver circuitry and control circuitry, whereby the transceiver circuitry, under control of the control circuitry, is configured to:
   transmit first data to a first mobile device and second data to a second mobile device, wherein the transmission period of the second data is shorter than the transmission period of the first data and the second data is transmitted after, and uses the resources allocated to, the first data;
   transmit to the first mobile device re-transmit data that contains information indicating that retransmission of the first data whose resources were allocated to the second data will take place after the transmission of the first data.

10. Infrastructure equipment according to paragraph 9, wherein the re-transmit data indicates a time slot during which the retransmission will occur.

11. Infrastructure equipment according to paragraph 10, wherein the re-transmit data indicates a time slot that starts after the end of the transmission of the first data and ends before the time slot allocated to the first mobile device to provide a reception receipt.

12. Infrastructure equipment according to paragraph 11, wherein the reception receipt is a Hybrid Automatic Repeat Request.

13. Infrastructure equipment according to paragraph 9 to 12, wherein the re-transmit data indicates a time slot during which the retransmission will not occur.

14. Infrastructure equipment according to paragraph 9 to 12, wherein the transceiver circuitry is configured to perform the retransmission after the end of the transmission of the first data and before the time slot allocated to the first mobile device to provide a reception receipt.

15. A mobile device for use in a telecommunications system, the mobile device comprising:
transceiver circuitry and control circuitry, whereby the transceiver circuitry, under control of the control circuitry, is configured to:
receive first data from infrastructure equipment in the telecommunication system and punctured data wherein the transmission period of the punctured data is shorter than the transmission period of the first data and the punctured data is transmitted after the start of the first data, and uses transmission resources allocated to, the first data; and
receive from the infrastructure equipment, indication data that contains information identifying the resources allocated to the punctured data, wherein the granularity of the resources is determined in accordance with the first data.

16. A mobile device according to paragraph 15, wherein the granularity of the resources is determined in accordance with the size of the first data.

17. A mobile device according to paragraph 16, wherein the granularity of the resources is a percentage of the size of the first data.

18. A mobile device according to paragraph 15 to 17, wherein the granularity of the resources is determined in accordance with the code rate of the first data.

19. A mobile device according to paragraph 18, wherein the granularity of the resources is a function of the code rate of the first data.

20. A mobile device according to paragraph 15 to 19, wherein the second data is formed of symbols and the granularity of the resources is the smallest number of symbols that can be occupied by the second data.

21. A mobile device according to paragraph 20, wherein the granularity of the resources allocated to the second data is temporally aligned to the start of the transmission of the second data.

22. A mobile device according to paragraph 15 to 21, wherein the granularity of the resources allocated to the second data is a multiple of the minimum of the size of the second data.

23. A mobile device for use in a telecommunications system, the mobile device comprising:
transceiver circuitry and control circuitry, whereby the transceiver circuitry, under control of the control circuitry, is configured to:
receive first data from infrastructure equipment in the telecommunication system and punctured data, wherein the transmission period of the punctured data is shorter than the transmission period of the first data and the punctured data is transmitted after, and uses the resources allocated to, the first data;
receive from the infrastructure equipment re-transmit data that contains information indicating that retransmission of the first data whose resources were allocated to the punctured data will take place after the transmission of the first data.

24. A mobile device according to paragraph 23, wherein the re-transmit data indicates a time slot during which the retransmission will occur.

25. A mobile device according to paragraph 24, wherein the re-transmit data indicates a time slot that starts after the end of the transmission of the first data and ends before the time slot allocated to the mobile device to provide a reception receipt.

26. A mobile device according to paragraph 25, wherein the reception receipt is a Hybrid Automatic Repeat Request.

27. A mobile device according to paragraph 23 to 26, wherein the re-transmit data indicates a time slot during which the retransmission will not occur.

28. A mobile device according to paragraph 23 to 26, wherein the transceiver circuitry is configured to receive the retransmission after the end of the transmission of the first data and before the time slot allocated to the mobile device to provide a reception receipt.

29. A mobile device according to paragraph 23 to 26, wherein the transceiver circuitry is configured to monitor for the retransmission of the first data only during the indicated time slot.

30. A method of operating infrastructure equipment for use in a telecommunications system, the method comprising:
transmitting first data to a first mobile device and second data to a second mobile device, wherein the transmission period of the second data is shorter than the transmission period of the first data and the second data is transmitted after the start of the first data, and uses transmission resources allocated to, the first data; and
transmitting to the first mobile device, indication data that contains information identifying the resources allocated to the second data, wherein the granularity of the resources is determined in accordance with the first data.

31. A method according to paragraph 30, wherein the granularity of the resources is determined in accordance with the size of the first data.

32. A method according to paragraph 31, wherein the granularity of the resources is a percentage of the size of the first data.

33. A method according to paragraph 30 to 32, wherein the granularity of the resources is determined in accordance with the code rate of the first data.

34. A method according to paragraph 33, wherein the granularity of the resources is a function of the code rate of the first data.

35. A method according to paragraph 30 to 34, wherein the second data is formed of symbols and the granularity of the resources is the smallest number of symbols that can be occupied by the second data.

36. A method according to paragraph 35, wherein the granularity of the resources allocated to the second data is temporally aligned to the start of the transmission of the second data.

37. A method according to paragraph 30 to 36, wherein the granularity of the resources allocated to the second data is a multiple of the minimum of the size of the second data.

38. A method of operating infrastructure equipment for use in a telecommunications system, the method comprising:
transmitting first data to a first mobile device and second data to a second mobile device, wherein the transmission period of the second data is shorter than the transmission period of the first data and the second data is transmitted after, and uses the resources allocated to, the first data;
transmitting to the first mobile device re-transmit data that contains information indicating that retransmission of the first data whose resources were allocated to the second data will take place after the transmission of the first data.

39. A method according to paragraph 38, wherein the re-transmit data indicates a time slot during which the retransmission will occur.

40. A method according to paragraph 39, wherein the re-transmit data indicates a time slot that starts after the end of the transmission of the first data and ends before the time slot allocated to the first mobile device to provide a reception receipt.

41. A method according to paragraph 40, wherein the reception receipt is a Hybrid Automatic Repeat Request.

42. A method according to paragraph 38 to 41, wherein the re-transmit data indicates a time slot during which the retransmission will not occur.

43. A method according to paragraph 38 to 42, comprising performing the retransmission after the end of the transmission of the first data and before the time slot allocated to the first mobile device to provide a reception receipt.

44. A method of operating a mobile device for use in a telecommunications system, the method comprising:
receiving first data from infrastructure equipment in the telecommunication system and punctured data wherein the transmission period of the punctured data is shorter than the transmission period of the first data and the punctured data is transmitted after the start of the first data, and uses transmission resources allocated to, the first data; and
receiving from the infrastructure equipment, indication data that contains information identifying the resources allocated to the punctured data, wherein the granularity of the resources is determined in accordance with the first data.

45. A method according to paragraph 44, wherein the granularity of the resources is determined in accordance with the size of the first data.

46. A method according to paragraph 45, wherein the granularity of the resources is a percentage of the size of the first data.

47. A method according to paragraph 44 to 46, wherein the granularity of the resources is determined in accordance with the code rate of the first data.

48. A method according to paragraph 47, wherein the granularity of the resources is a function of the code rate of the first data.

49. A method according to paragraph 44 to 48, wherein the second data is formed of symbols and the granularity of the resources is the smallest number of symbols that can be occupied by the second data.

50. A method according to paragraph 49, wherein the granularity of the resources allocated to the second data is temporally aligned to the start of the transmission of the second data.

51. A method according to paragraph 44 to 50, wherein the granularity of the resources allocated to the second data is a multiple of the minimum of the size of the second data.

52. A method of operating a mobile device for use in a telecommunications system, the method comprising:
receiving first data from infrastructure equipment in the telecommunication system and punctured data, wherein the transmission period of the punctured data is shorter than the transmission period of the first data and the punctured data is transmitted after, and uses the resources allocated to, the first data;
receiving from the infrastructure equipment re-transmit data that contains information indicating that retransmission of the first data whose resources were allocated to the punctured data will take place after the transmission of the first data.

53. A method according to paragraph 52, wherein the re-transmit data indicates a time slot during which the retransmission will occur.

54. A method according to paragraph 53, wherein the re-transmit data indicates a time slot that starts after the end of the transmission of the first data and ends before the time slot allocated to the mobile device to provide a reception receipt.

55. A method according to paragraph 54, wherein the reception receipt is a Hybrid Automatic Repeat Request.

56. A method according to paragraph 52 to 55, wherein the re-transmit data indicates a time slot during which the retransmission will not occur.

57. A method according to paragraph 52 to 56, comprising receiving the retransmission after the end of the transmission of the first data and before the time slot allocated to the mobile device to provide a reception receipt.

58. A method according to paragraph 52 to 57, comprising monitoring for the retransmission of the first data only during the indicated time slot.

59. Integrated circuitry comprising transceiver circuitry and control circuitry, whereby the transceiver circuitry, under control of the control circuitry, is configured to:
transmit first data to a first mobile device and second data to a second mobile device, wherein the transmission period of the second data is shorter than the transmission period of the first data and the second data is transmitted after the start of the first data, and uses transmission resources allocated to, the first data; and
transmit to the first mobile device, indication data that contains information identifying the resources allocated to the second data, wherein the granularity of the resources is determined in accordance with the first data.

60. Integrated circuitry comprising transceiver circuitry and control circuitry, whereby the transceiver circuitry, under control of the control circuitry, is configured to:
transmit first data to a first mobile device and second data to a second mobile device, wherein the transmission period of the second data is shorter than the transmission period of the first data and the second data is transmitted after, and uses the resources allocated to, the first data;
transmit to the first mobile device re-transmit data that contains information indicating that retransmission of the first data whose resources were allocated to the second data will take place after the transmission of the first data.

61. Integrated circuitry comprising transceiver circuitry and control circuitry, whereby the transceiver circuitry, under control of the control circuitry, is configured to:
receive first data from infrastructure equipment in the telecommunication system and punctured data wherein the transmission period of the punctured data is shorter than the transmission period of the first data and the punctured data is transmitted after the start of the first data, and uses transmission resources allocated to, the first data; and receive from the infrastructure equipment, indication data that contains information identifying the resources allocated to the punctured data, wherein the granularity of the resources is determined in accordance with the first data.

62. Integrated circuitry comprising transceiver circuitry and control circuitry, whereby the transceiver circuitry, under control of the control circuitry, is configured to: receive first data from infrastructure equipment in the telecommunication system and punctured data, wherein the transmission period of the punctured data is shorter than the transmission period of the first data and the punctured data is transmitted after, and uses the resources allocated to, the first data;

receive from the infrastructure equipment re-transmit data that contains information indicating that retransmission of the first data whose resources were allocated to the punctured data will take place after the transmission of the first data.

63. A computer program product comprising computer readable instructions which, when loaded onto a computer, configure the computer to perform a method according to any one of paragraph 30 to 58.

REFERENCES

[1] RP-160671, "New SID Proposal: Study on New Radio Access Technology," NTT DOCOMO, RAN #71
[2] RP-170847, "New WID on New Radio Access Technology," NTT DOCOMO, INC., RAN #75
[3] Holma H. and Toskala A, "LTE for UMTS OFDMA and SC-FDMA based radio access", John Wiley and Sons, 2009

The invention claimed is:

1. A network node comprising transceiver circuitry and control circuitry, whereby the transceiver circuitry, under control of the control circuitry, is configured to:
initiate transmission of first data to a first mobile device and second data to a second mobile device, the first data corresponding to a transport block (TB), the TB comprising a plurality of code block groups (CBGs), each of the plurality of CBGs corresponding to a respective set of code blocks (CBs),
transmit, to the first mobile device, an indication of preemption granularity;
transmit, to the first mobile device, a preemption indicator that contains information identifying transmission resources that were allocated for transmission of the first data but that were preempted to transmit the second data;
receive hybrid automatic repeat request (HARQ) feedback for the first data, wherein a respective HARQ acknowledgement (ACK) or negative acknowledgement (NACK) is provided for each of the plurality of CBGs comprised in the TB, a HARQ ACK is provided for a respective CBG if each of the CBs of the respective CBG is successfully received, and a HARQ NACK is provided for a respective CBG if at least one of the CBs comprised in the respective CBG is not successfully received;
transmit, to the first mobile device, downlink control information (DCI) indicating a retransmission, wherein the retransmission corresponds to a portion of the first data, wherein the portion of the first data corresponds to at least one CBG of the plurality of CBGs comprised in the TB, the DCI comprises an indication of the at least one CBG, and the DCI indicates a time window for receiving the at least one CBG at the mobile device; and
transmit, to the first mobile device, the at least one CBG in accordance with the DCI.

2. The network node according to claim 1, wherein the transceiver circuitry is configured to: cause the first mobile device to receive the preemption indicator at an end of a first slot, wherein the transmission of the first data comprises the first slot.

3. The network node according to claim 1, wherein:
the transmission of the first data comprises a first slot; and
the transceiver circuitry is configured to: cause the first mobile device to receive the preemption indicator at the beginning of a second slot, the second slot occurring after the first slot.

4. The network node according to claim 3, wherein the second slot occurs immediately after the first slot.

5. The network node according to claim 1, wherein:
the transmission of the first data comprises a first slot; and
the transceiver circuitry is configured to: cause the first mobile device to:
send, to the network, a NACK pertaining to the first slot; and
receive the preemption indicator at the beginning of a second slot, the second slot being a slot occurring after the NACK.

6. The network node of claim 1, wherein the transmission resources that were allocated for transmission of the first data but that were preempted to transmit second data include resources from more than one CB.

7. The network node of claim 1, wherein the preemption granularity corresponds to a size and/or shape of a time-frequency region of resources for which preemption is indicated by the preemption indicator.

8. The network node of claim 1, wherein a same number of bits are used for the preemption indicator for a first preemption granularity as a number of bits used for the preemption indicator for a second preemption granularity.

9. The network node of claim 1, wherein the transceiver circuitry is configured to: receive the indication of preemption granularity in a radio resource control message.

10. A mobile device for use in a telecommunications system, the mobile device comprising transceiver circuitry and control circuitry, whereby the transceiver circuitry, under control of the control circuitry, is configured to:
receive, from a network node in the telecommunication system, first data, the first data corresponding to a transport block (TB), the TB comprising a plurality of code block groups (CBGs), each of the plurality of CBGs corresponding to a respective set of code blocks (CBs);
receive, from the network node, an indication of preemption granularity;
receive from the network node, a preemption indicator;
determine that transmission resources that were allocated for transmission of the first data have been preempted based on the indication of preemption granularity and the preemption indicator;
transmit hybrid automatic repeat request (HARQ) feedback for the first data, wherein a respective HARQ acknowledgement (ACK) or negative acknowledgement (NACK) is provided for each of the plurality of CBGs comprised in the TB, a HARQ ACK is provided for a respective CBG if each of the CBs of the respective CBG is successfully received, and a HARQ NACK is provided for a respective CBG if at least one of the CBs comprised in the respective CBG is not successfully received;

receive, from the network node, downlink control information (DCI) indicating a retransmission, wherein the retransmission corresponds to a portion of the first data, wherein the portion of the first data corresponds to at least one CBG of the plurality of CBGs comprised in the TB, the DCI comprises an indication of the at least one CBG, and the DCI indicates a time window for receiving the at least one CBG at the mobile device; and receive, from the network node, the at least one CBG in accordance with the DCI.

11. The mobile device of claim 10, wherein the transceiver circuitry is further configured to receive the preemption indicator at an end of a first slot, wherein the transmission of the first data comprises the first slot.

12. The mobile device of claim 10, wherein:
the transmission of the first data comprises a first slot; and
the transceiver circuitry is further configured to receive the preemption indicator at the beginning of a second slot, the second slot occurring after the first slot.

13. The mobile device of claim 12, wherein the second slot occurs immediately after the first slot.

14. The mobile device of claim 10, wherein the transmission of the first data comprises a first slot; and
the transceiver circuitry is further configured to:
send, to the network, a NACK pertaining to the first slot; and
receive the preemption indicator at the beginning of a second slot, the second slot being a slot occurring after the NACK.

15. The mobile device of claim 10, wherein the preemption granularity corresponds to a size and/or shape of a time-frequency region of resources for which preemption is indicated by the preemption indicator.

16. The mobile device of claim 10, wherein a same number of bits are used for the preemption indicator for a first preemption granularity as a number of bits used for the preemption indicator for a second preemption granularity.

17. The mobile device of claim 10, wherein the transceiver circuitry is configured to: receive the indication of preemption granularity in a radio resource control message.

18. The mobile device of claim 10, wherein the transmission resources that were allocated for transmission of the first data but that were preempted to transmit second data include resources from more than one CB.

* * * * *